United States Patent [19]
Cox et al.

[11] Patent Number: 5,766,454
[45] Date of Patent: Jun. 16, 1998

[54] HOME WASTEWATER TREATMENT AND DENITRIFICATION SYSTEM

[75] Inventors: Raleigh Lee Cox; Michael Catanzaro, both of Baton Rouge, La.

[73] Assignee: Delta Environmental Products, Inc., Denham Springs, La.

[21] Appl. No.: 702,968

[22] Filed: Aug. 26, 1996

[51] Int. Cl.⁶ .................. C02F 3/02; C02F 11/02
[52] U.S. Cl. .............. 210/150; 210/151; 210/198.1; 210/202; 210/259; 210/615; 210/630; 210/903
[58] Field of Search .................. 210/150, 151, 210/198.1, 202, 259, 903, 615, 630

[56] References Cited

U.S. PATENT DOCUMENTS

| | | | |
|---|---|---|---|
| 3,871,999 | 3/1975 | Torpey | 210/903 |
| 3,994,802 | 11/1976 | Casey et al. | 210/903 |
| 4,043,936 | 8/1977 | Francis et al. | 210/903 |
| 4,173,531 | 11/1979 | Matsch et al. | 210/903 |
| 4,650,577 | 3/1987 | Hansel | 210/195.3 |
| 5,032,276 | 7/1991 | Mackrle et al. | 210/630 |
| 5,049,266 | 9/1991 | Götz et al. | 210/151 |
| 5,211,847 | 5/1993 | Kanow | 210/615 |
| 5,288,406 | 2/1994 | Stein | 210/903 |
| 5,288,407 | 2/1994 | Bodwell et al. | 210/630 |
| 5,482,630 | 1/1996 | Lee et al. | 210/150 |

*Primary Examiner*—Neil McCarthy
*Attorney, Agent, or Firm*—Roy, Kiesel & Tucker, PLC

[57] ABSTRACT

A wastewater treatment system: The system entails an aerobic tank and an anaerobic tank. Wastewater enters the aerobic tank where it is aerobically treated. The effluent then flows to the anaerobic tank where it is anaerobically treated to remove nitrogen in the wastewater. A filter may be added to the discharge line from the anaerobic tank to remove any suspended solids emitted with the effluent from the anaerobic tank.

28 Claims, 2 Drawing Sheets

HOME WASTEWATER TREATMENT AND DENITRIFICATION SYSTEM

BACKGROUND OF THE INVENTION

1. Field of the Invention

The invention relates generally to the treatment of home wastewater and more particularly to the denitrification of home wastewater.

2. Prior Art

In the prior art, aerobic treatment units, such as that disclosed in U.S. Pat. No. 4,650,577, are used to aerobically treat home sewage. These systems produce effluent that is well below the BOD and suspended solid levels allowed by the various state and federal discharge authorities. However, because there is little or no anaerobic area in such systems, there is little denitrification of the wastewater. Thus, these systems produce a clear effluent that contains very few bacteria or suspended solids but that contains a high level of nitrites and nitrates.

OBJECTS OF THE INVENTION

It is an object of the invention to denitrify wastewater in a wastewater treatment system.

It is another object of the invention to denitrify without requiring the addition of food to the system for the bacteria.

It is another object of the invention that the system require backwashing only infrequently.

It is still another object of the invention that the system require a minimal amount of maintenance.

SUMMARY OF THE INVENTION

A wastewater treatment system is disclosed. The system comprises an aerobic tank and an anaerobic tank. Wastewater enters the aerobic tank where it is aerobically treated. The effluent then flows to the anaerobic tank where it is anaerobically treated to remove nitrogen in the wastewater. A filter may be added to the discharge line from the anaerobic tank to remove any suspended solids emitted with the effluent from the anaerobic tank.

Typically the aerobic treatment tank will have a centrally located clarifier and a plurality of air lines surrounding the exterior of the clarifier. Compressed air is pumped into the aerobic treatment tank via the air lines to foster the growth of aerobic bacteria. Wastewater will flow into the aerobic treatment tank exterior to the clarifier and flow out of the aerobic treatment tank from the interior of the clarifier. The water will then flow into the anaerobic tank.

The anaerobic tank should be water tight, but not air tight. The tank is filled with a bacteria growth media, having a high surface area to volume ratio. One such commercially available media is the Munter's BIOdek®, available in surface areas ranging from 30–68 ft$^2$/ft$^3$. The media rests on a support structure which comprises a raised frame. This frame allows the media to rest above the bottom of the tank.

Water flows into the tank through an inlet positioned near the bottom of the tank, up through the bacteria growth media to an outlet positioned above or near the top of the media. By installing the tank so that the outlet is positioned at or below the natural water line, water in the tank will run out via gravity.

Bacteria grow on the media. These bacteria need oxygen to digest their food. However, the water contains very little dissolved oxygen, so the bacteria must obtain their oxygen from another source. The nitrogen bearing substances, nitrate and nitrite, (NO$_x$) in the water provide such a source. The bacteria attack these substances to get the oxygen they contain. The nitrogen is released and forms nitrogen gas N$_2$(g) which bubbles out of the tank. Thus, when the water has passed through the media, the bacteria will have removed much of the nitrogen.

DETAILED DESCRIPTION OF THE INVENTION

Figure 1:
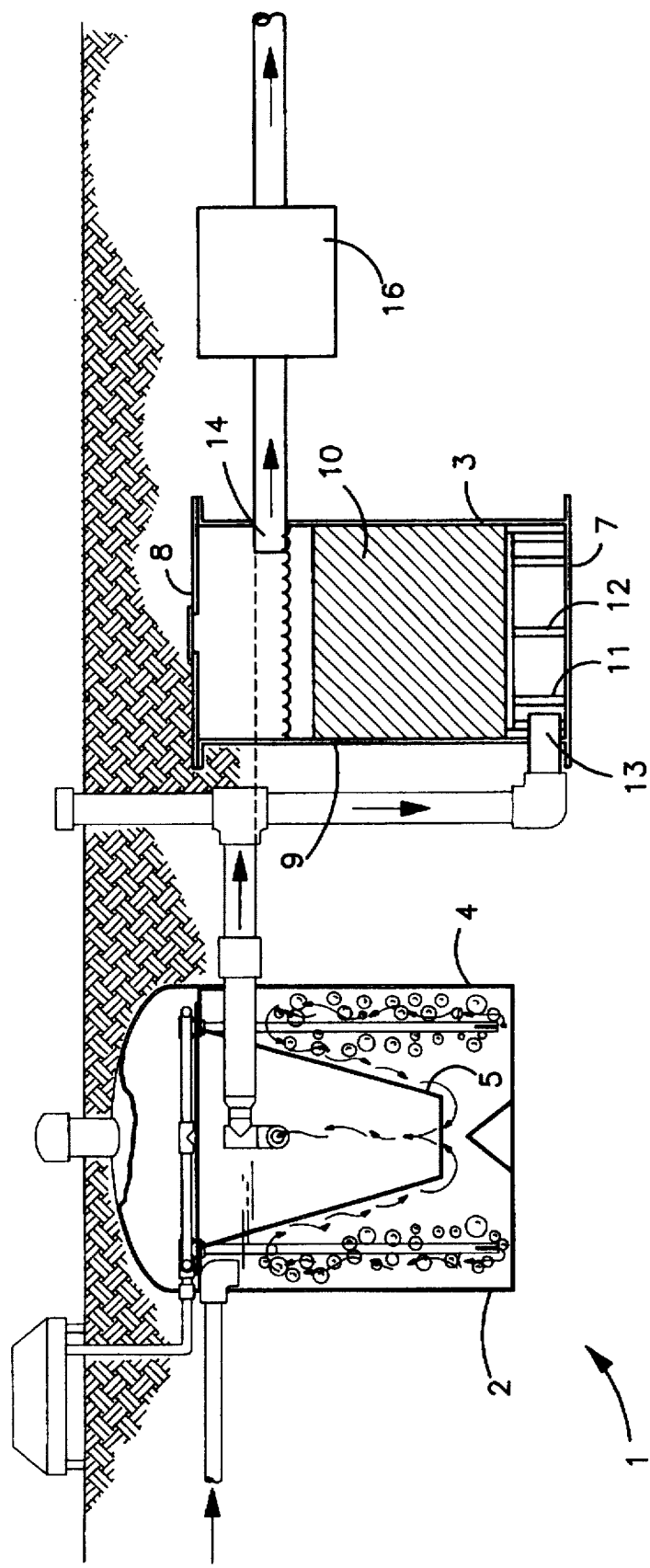
FIG. 1 is a depiction of a wastewater treatment system.
Figure 2:
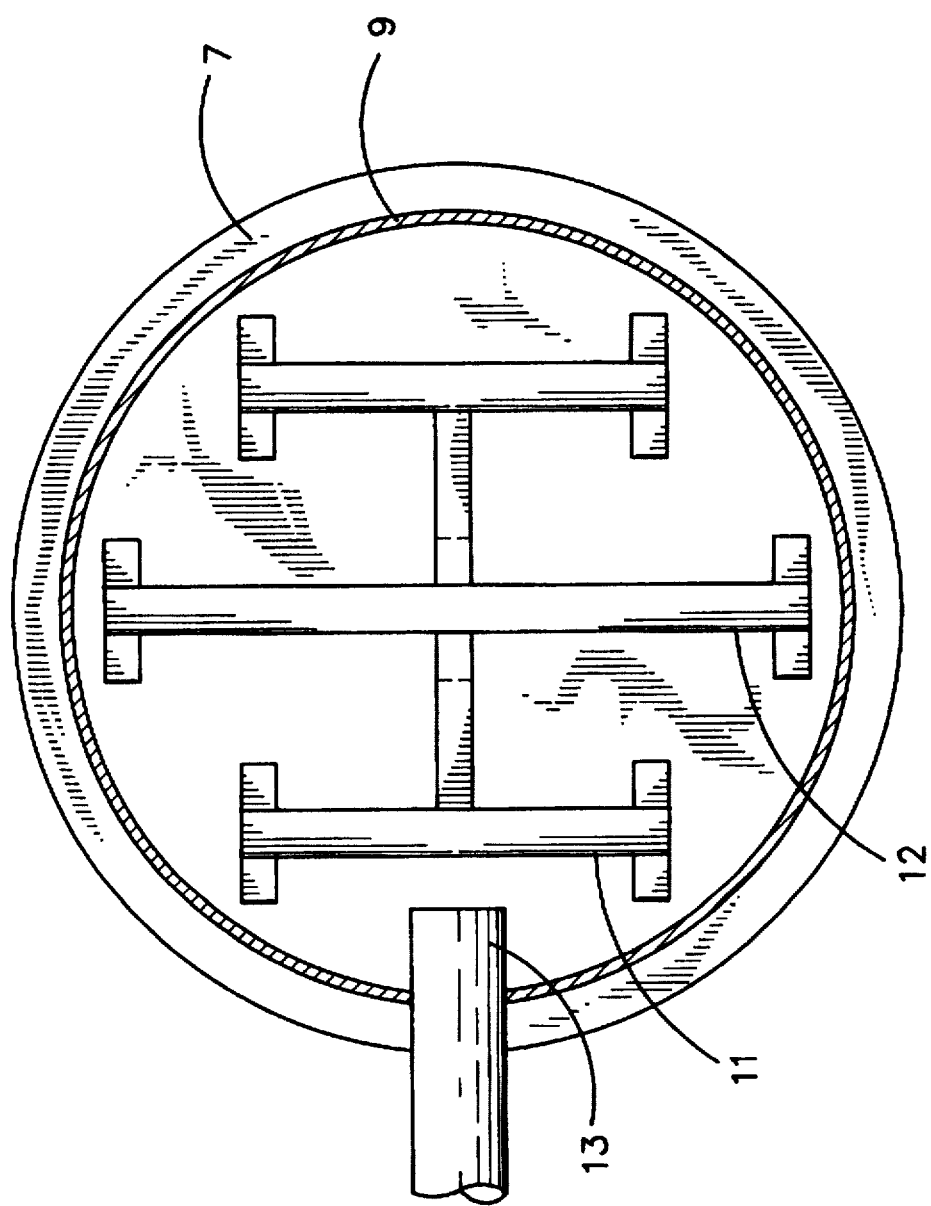
FIG. 2 is a depiction of a support structure.

A wastewater treatment system 1 is disclosed. System 1 comprises an aerobic treatment means 2 fluidly attached to a denitrification tank 3. Typically aerobic treatment means 2 will comprise an aerobic treatment tank 4 having a centrally located clarifier 5 and a plurality of air lines 6 surrounding the exterior of clarifier 5. Compressed air is pumped into aerobic treatment tank 4 via air lines 6 to foster the growth of aerobic bacteria. Wastewater will flow into aerobic treatment tank 4 exterior to clarifier 5 and flow out of aerobic treatment tank 4 from the interior of clarifier 5. The effluent from aerobic treatment tank 4 will then flow into denitrification tank 3 where it will be denitrified.

Denitrification tank 3 comprises a bottom 7, a top 8, and sides 9 which, in a preferred embodiment are cylindrical. Denitrification tank 3 should be watertight, but not airtight. Denitrification tank 3 is filled with bacteria growth media 10, having a high surface area to volume ratio. One such commercially available media is the Munter's BIOdek®, available in surface areas ranging from 30–68 ft $^2$/ft$^3$. In a preferred embodiment, media 10 rests on a support structure 11 which comprises a raised frame 12 and which may be constructed of wood, plastic, fiberglass, metal, concrete or any other similar substance. Frame 12 allows media 10 to rest above the bottom of denitrification tank 3. Water preferably flows into denitrification tank 3 through an inlet 13 positioned near bottom 7, up through media 10 to an outlet 14 positioned above or near the top of media 10.

Bacteria will grow on media 10. These bacteria need oxygen to digest their food. However, the tank contains very little dissolved oxygen, so the bacteria must obtain their oxygen from other sources. The nitrogen bearing substances (NO$_x$) are such a source. The bacteria will break the nitrogen-oxygen bonds and consume the oxygen, leaving the nitrogen behind. The nitrogen will form nitrogen gas (N$_2$) and bubble out of the water.

The ability of denitrification tank 3 to denitrify depends on the number of bacteria present. The more bacteria there are, the more nitrogen the tank can remove. Media 10 provides habitat for the bacteria. The greater the surface area of media 10, the greater the number of bacteria the system can support.

The number of bacteria that can grow per square foot of media 10 depends upon the food available in the water. Generally, the water entering denitrification tank 3 has very little food in it as it is quite clean when it leaves aerobic treatment means 2. To provide the bacteria with food, carbon sources such as methanol may be periodically introduced into denitrification tank 3. This is not desirable in a system designed for home use because it requires maintenance either on the part of the homeowner or by a service provider. Thus, the claimed system is designed to reduce, or eliminate altogether, the need to provide the bacteria with additional food. Another feeding option is to route a small amount of raw sewage directly into denitrification tank 3. This also is undesirable because of the risk that some of the untreated sewage may be emitted from denitrification tank 3 and because of the homeowner's inability to monitor the quality of the effluent.

Having a large number of bacteria per square foot has a disadvantage as well. As the bacteria grow, their bodies build up deposits on the media. As the bacteria die, portions of these deposits become dislodged, or "slough off," and may be emitted with the effluent, raising the suspended solids above the acceptable level. Feeding the bacteria will exacerbate this problem.

These problems may be addressed by utilizing the phenomenon of endogenous respiration. If there is an insufficient amount of food present, the bacteria will resort to endogenous respiration to supplement the available food. In endogenous respiration, the bacteria utilizes its own protoplasm to stay alive. In this situation, there are far fewer bacteria per square foot of surface area, so sloughing is not as great a problem. Furthermore, the bacteria do not have to be fed; they will survive on the small amount of nutrients in the water.

Of course to have effective denitrification, a sufficient number of bacteria must be present. This can be ensured by increasing the available surface area of media 10 to provide for more bacteria in denitrification tank 3. It is not known exactly why increasing the surface area available to the bacteria will increase their numbers when the food and oxygen sources ($NO_x$) in the water remain constant. One theory assumes that the limiting factor on the growth of the bacteria is usually not the presence or absence of food and oxygen in the water, but the accessibility of that food and oxygen to the bacteria. Most of the bacteria are physically attached to media 10 and cannot forage. Therefore, the only food and oxygen sources ($NO_x$) accessible to the bacteria are contained in water that comes in contact with media 10. As the surface area per unit volume increases, more of the water will come into contact with media 10, allowing more of the food and oxygen sources in the water to reach the bacteria. Thus, by more efficiently using the resources in the water, more bacteria can be supported and more nitrogen can be removed.

To further enhance the efficiency of such a system, the water in denitrification tank 3 may be stirred. This may be accomplished by positioning a stirring means (not shown) such as a recirculating pump or a propeller in denitrification tank 3. In a preferred embodiment, stirring means should be located away from the surface and should not create substantial disturbances on the surface in order to avoid aerating the water in denitrification tank 3. Preferably, the circulation caused by stirring means should be relatively gentle in order to avoid dislodging the bodies of the bacteria from media 10.

The amount of surface area required from media 10 will vary from place to place. In different geographic regions with differing water supplies and climates, the types of bacteria vary. These different bacteria will break down the nitrogen bearing substances at varying rates. The inventor has tested his invention in Baton Rouge, La., and found that in a 500 gal/day tank having a media 10 that provided 30 $ft^2/ft^3$, the bacteria, operating under endogenous respiration, would remove 4 mg/L of nitrogen bearing substances per 50 $ft^3$. Therefore, to reduce the nitrogen content from 30 mg/L to a typical required level of 15 mg/L, approximately 200 $ft^3$ of 30 $ft^2/ft^3$ media 10 would be required. Bacteria operating under endogenous respiration are known to denitrify at a rate of 0.017–0.048 g $NO_x$/gal/ day. "Principles and Practice of Nutrient Removal from Municipal Wastewater," The Soap and Detergent Association, p.11 (1988). Based on this information and the observed denitrification rates, it is anticipated that at least 70 to 600 $ft^3$ of 30 $ft^2/ft^3$ media 10 will be required to remove 15 mg/L of $NO_x$ from the wastewater in a 500 gal/day denitrification tank 3 using endogenous respiration. Of course, the volume required may be reduced by using a media which provides more surface area per cubic foot.

If the bacteria are provided a carbon source, such as methanol, the denitrification rate rises as high as 0.90 g $NO_x$/gal/day. Id. Under these circumstances, it is anticipated that as little as 1 $ft^3$ of 30 $ft^2/ft^3$ media 10 would be required to remove 15 mg/L. However, such a small volume may cause sloughing difficulties, discussed more thoroughly above. Therefore, even when the bacteria are being fed, it may be desirable to use at least 10 $ft^3$ of media 10.

In many industrial sites, the denitrification tanks are backwashed daily. Backwashing entails flowing water at an increased rate of speed through the tank, generally in the direction opposite to that which the water usually flows. This backwashing dislodges many of the bacteria from the media. This prevents the bacteria from building up and sloughing off to become suspended solids in the effluent. Such daily backwashing would be impractical for home use; however, the need to backwash may be reduced by maintaining the bacteria in endogenous conditions. As explained above, this reduces the total number of bacteria in the system, thereby reducing the number of bacteria that could slough off.

The difficulties caused by sloughing may also be partially overcome by maintaining a flow rate through denitrification tank 3 that is slow. Most of the bacteria bodies are heavier than water, but not so heavy that they sink quickly. By maintaining a slow flow rate, the bodies that slough off will have time to settle to the bottom of denitrification tank 3 before they are carried out with the effluent. The flow rate may be maintained by keeping the surface area of denitrification tank 3 sufficiently large relative to the volume of water denitrification tank 3 handles daily. It is anticipated that a ratio of between 0.01 and 0.05 $ft^2$/gal/day will be sufficient. Thus, a 500 gal/day tank should have a surface area of at least 5 to 25 $ft^2$.

Finally, a filtration means 16 may be placed in the effluent path to eliminate any suspended solids that make it out of denitrification tank 3. Filtration means 16 may include screen, discs, sand, floating media, fabric, or other common types of filters capable of removing small solid particles.

It is anticipated that wastewater treatment system 1 will be periodically serviced. This servicing may entail pumping out accumulated sludge from aeration means 2. It may also entail backwashing denitrification tank 3 to clean media 10 and replacing or cleaning filtration means 16. The service personnel may also periodically provide a food source to the bacteria in denitrification tank 3.

Other uses and embodiments of the invention will occur to those skilled in the art, and are intended to be included within the scope and spirit of the following claims.

We claim:

1. A wastewater treatment tank for denitrifying aerobically treated wastewater comprising:

a top;

sides extending from said top;

a bottom attached to said sides opposite said top;

an inlet for receiving said wastewater;

an outlet for emitting an effluent stream; and a bacteria growth media positioned within said denitrification tank wherein said media provides at least about 4.2 square feet of surface area for each gallon of said effluent emitted per day.

2. A wastewater treatment tank according to claim 1 wherein said media provides at least about 24 square feet of surface area for each gallon of said effluent emitted per day.

3. A wastewater treatment tank according to claim 2 wherein said tank has at least about 0.01 square feet of surface area for each gallon of said effluent emitted per day.

4. A wastewater treatment tank according to claim 2 wherein said tank has at least about 0.025 square feet of surface area for each gallon of said effluent emitted per day.

5. A wastewater treatment tank according to claim 2 wherein said tank has at least about 0.05 square feet of surface area for each gallon of said effluent emitted per day.

6. A wastewater treatment tank according to claim 1 wherein said media provides at least about 36 square feet of surface area for each gallon of said effluent emitted per day.

7. A wastewater treatment tank according to claim 6 wherein said tank has at least about 0.01 square feet of surface area for each gallon of said effluent emitted per day.

8. A wastewater treatment tank according to claim 6 wherein said tank has at least about 0.025 square feet of surface area for each gallon of said effluent emitted per day.

9. A wastewater treatment tank according to claim 6 wherein said tank has at least about 0.05 square feet of surface area for each gallon of said effluent emitted per day.

10. A wastewater treatment tank according to claim 1 wherein said tank has at least about 0.01 square feet of surface area for each gallon of said effluent emitted per day.

11. A wastewater treatment tank according to claim 1 wherein said tank has at least about 0.025 square feet of surface area for each gallon of said effluent emitted per day.

12. A wastewater treatment tank according to claim 1 wherein said tank has at least about 0.05 square feet of surface area for each gallon of said effluent emitted per day.

13. A wastewater treatment tank according to claim 1 further comprising a means for stirring the water in said denitrification tank.

14. A wastewater treatment tank according to claim 1, 2, 3, 4, 5, 6, 7, 8, 9, 10 or 12 further comprising a means for filtering said effluent stream.

15. A wastewater treatment system comprising:

a means for aerobically treating wastewater;

a denitrification tank fluidly connected to said means for aerobically treating wastewater, said denitrification tank comprising a top, sides extending from said top, a bottom attached to said sides opposite said top, an inlet for receiving said aerobically treated wastewater and an outlet for emitting an effluent stream; and a bacteria growth media positioned within said denitrification tank wherein said media provides at least about 4.2 square feet of surface area for each gallon of said effluent emitted per day.

16. A wastewater treatment system according to claim 15 wherein said media provides at least about 24 square feet of surface area for each gallon of said effluent emitted per day.

17. A wastewater treatment system according to claim 16 wherein said tank has at least about 0.01 square feet of surface area for each gallon of said effluent emitted per day.

18. A wastewater treatment system according to claim 16 wherein said tank has at least about 0.025 square feet of surface area for each gallon of said effluent emitted per day.

19. A wastewater treatment system according to claim 16 wherein said tank has at least about 0.05 square feet of surface area for each gallon of said effluent emitted per day.

20. A wastewater treatment system according to claim 15 wherein said media provides at least about 36 square feet of surface area for each gallon of said effluent emitted per day.

21. A wastewater treatment system according to claim 20 wherein said tank has at least about 0.01 square feet of surface area for each gallon of said effluent emitted per day.

22. A wastewater treatment system according to claim 20 wherein said tank has at least about 0.025 square feet of surface area for each gallon of said effluent emitted per day.

23. A wastewater treatment system according to claim 20 wherein said tank has at least about 0.05 square feet of surface area for each gallon of said effluent emitted per day.

24. A wastewater treatment system according to claim 15 wherein said tank has at least about 0.01 square feet of surface area for each gallon of said effluent emitted per day.

25. A wastewater treatment system according to claim 15 wherein said tank has at least about 0.025 square feet of surface area for each gallon of said effluent emitted per day.

26. A wastewater treatment tank according to claim 15 wherein said tank has at least about 0.05 square feet of surface area for each gallon of said effluent emitted per day.

27. A wastewater treatment tank according to claim 15 further comprising a means for stirring the water in said denitrification tank.

28. A wastewater treatment tank according to claim 15, 16, 17, 18, 19, 20, 21, 22, 23, 24, 25, 26, and 27 further comprising a means for filtering said effluent stream.

* * * * *

UNITED STATES PATENT AND TRADEMARK OFFICE
CERTIFICATE OF CORRECTION

PATENT NO. : 5,766,454
DATED : June 16, 1998
INVENTOR(S) : Raleigh Lee Cox and Michael Catanzaro It is certified that error appears in the above-identified patent and that said Letters Patent is hereby corrected as shown below:

Column 6, line 46 "and" should read --or--

Signed and Sealed this

Sixth Day of October, 1998

Attest:

BRUCE LEHMAN

*Attesting Officer*  *Commissioner of Patents and Trademarks*